United States Patent [19]
Danjo et al.

[11] Patent Number: 5,751,568
[45] Date of Patent: May 12, 1998

[54] POWER SUPPLY APPARATUS FOR ARC-UTILIZING EQUIPMENT

[75] Inventors: Kenzo Danjo, Kyoto-fu; Atsushi Kinoshita, Osaka; Shigeru Okamoto, Hirakata; Haruo Moriguchi, Itami; Takashi Hashimoto, Kobe, all of Japan

[73] Assignee: Sansha Electric Manufacturing Company, Limited, Osaka, Japan

[21] Appl. No.: 758,691

[22] Filed: Dec. 3, 1996

[51] Int. Cl.$^6$ ............ H02M 3/335; H23K 9/095
[52] U.S. Cl. ............ 363/95; 219/130.32
[58] Field of Search ............ 363/65, 71, 95, 363/96, 98, 132, 68; 219/130.32; 307/66, 44; 336/175, 185; 315/209 R, 219, 224, 225, 307

[56] References Cited

U.S. PATENT DOCUMENTS

| | | | |
|---|---|---|---|
| 3,880,493 | 4/1975 | Lockhart, Jr. | 399/147 R |
| 4,013,937 | 3/1977 | Pelly et al. | 321/7 |
| 4,751,398 | 6/1988 | Ertz, III | 307/66 |
| 4,845,393 | 7/1989 | Burgess et al. | 310/51 |
| 4,985,819 | 1/1991 | Mori et al. | 363/37 |
| 5,023,768 | 6/1991 | Collier | 363/68 |
| 5,070,440 | 12/1991 | Walker | 363/71 |
| 5,262,699 | 11/1993 | Sun et al. | 315/209 R |
| 5,457,300 | 10/1995 | Karino et al. | |

FOREIGN PATENT DOCUMENTS

| | | |
|---|---|---|
| 0063424A2 | 10/1982 | European Pat. Off. |
| 902832 | 8/1962 | United Kingdom |
| 2075773 | 11/1981 | United Kingdom |
| WO 92/04760 | 3/1992 | WIPO |

*Primary Examiner*—Adolf Berhane
*Attorney, Agent, or Firm*—Duane, Morris & Heckscher LLP

[57] ABSTRACT

A power supply apparatus for arc-utilizing equipment includes a first converter for converting a received AC voltage to a DC voltage.

An inverter converts the DC voltage to a high-frequency voltage, which is applied to a voltage-transformer with primary and second windings. A voltage-transformed high-frequency voltage induced in the secondary winding is converted to a DC voltage in a second converter, which is developed between two output terminals. The respective ones of the two output terminals are connected to a torch electrode of the arc-utilizing equipment and a workpiece. A bypass capacitor and a high-frequency voltage generator circuit are serially connected between the two output terminals. A control circuit controls the high-frequency voltage generator circuit and the inverter circuit. The bypass capacitor is connected directly between one of the two output terminals and the high-frequency voltage generator circuit.

7 Claims, 2 Drawing Sheets

POWER SUPPLY APPARATUS FOR ARC-UTILIZING EQUIPMENT

This invention relates to a power supply apparatus for equipment which generates and uses an arc, such as arc welders and arc cutters, and, more particularly, to such apparatus which is prevented from being operating erroneously in response to noise.

BACKGROUND OF THE INVENTION

A power supply apparatus for arc welders and arc cutters includes a converter which converts an AC voltage applied thereto into a DC voltage. The DC voltage is then converted into a high-frequency voltage by an inverter. The high-frequency voltage is then re-converted into a DC voltage in another converter, and the resulting DC voltage is applied between a torch of the arc welder or arc cutter and a workpiece to be welded or cut. In order to generate an arc between the torch and the workpiece, a high-frequency generator circuit applies an attenuating pulsating voltage between the torch and the workpiece to generate a pilot arc therebetween. The pilot arc causes a steady-state arc to be generated between the torch and the workpiece. Once the steady-state arcing occurs, a control circuit controls the inverter in such a manner that a constant current flows between the torch and the workpiece.

The high-frequency voltage generator circuit tends to generate high-frequency noise during its operation. In addition, arc occurring between the torch and the workpiece also generates high-frequency noise. A switch is associated with the torch for use in turning on the high-frequency voltage generator circuit. The switch is connected to the control circuit through a cable. High-frequency noise generated during arcing may be coupled to the control circuit through the cable. High-frequency noise from the high-frequency voltage generator circuit may be also coupled to the control circuit. Such high-frequency noise may cause erroneous operation of the control circuit.

Conventionally, such power supply apparatus is placed in a relatively large casing and therefore, the lines through which high-frequency noise may be transmitted can be disposed sufficiently away from the control circuit in the casing, so that erroneous operation which could be caused by high-frequency noise can be prevented.

Recently, digital devices, such as a CPU and a PLD (Programmable Logic Device), have become available for use in the control circuit, which can make it possible to place the power supply apparatus in a smaller casing. However, because of the reduction in size of the casing, the lines through which high-frequency noise is transmitted should be disposed near the control circuit, so that the control circuit is liable to erroneously operation in response to high-frequency noise transmitted through the lines.

SUMMARY OF THE INVENTION

A power supply apparatus for arc-utilizing equipment according to the present invention includes first converter means which receives an AC voltage and converts the AC voltage into a DC voltage. Inverter means converts the DC voltage into a high-frequency voltage. A voltage-transformer having a primary winding and a secondary winding receives the high-frequency voltage across the primary winding and develops a voltage-transformed high-frequency voltage across the secondary winding. The voltage-transformed high-frequency voltage is converted into a DC voltage in second converter means. An output voltage of the second converter means is developed between two output terminals of the power supply apparatus. The two output terminals are adapted for connection to a torch electrode of a torch of the arc-utilizing equipment and a workpiece to be processed by the equipment.

One end of high-frequency voltage generating means is connected to one of the two output terminals. A bypass capacitor is directly connected between the other one of the two output terminals and the other end of the high-frequency voltage generating means. Control means is provided for controlling the high-frequency voltage generating means and the inverter means.

A circuit including two series-connected capacitors may be connected directly between the above-mentioned other output terminal and the above-mentioned other end of the high-frequency voltage generating means in parallel with the bypass capacitor, with the junction between the series-connected capacitors grounded.

Two switch terminals may be connected to the control means. The switch terminals are adapted to receive, from a switch associated with the torch, a command for turning on the high-frequency voltage generating means. A second bypass capacitor is connected directly between the two switch terminals.

A second circuit including two series-connected capacitors may be connected directly between the two switch terminals in parallel with the second bypass capacitor, with the junction between the series-connected capacitors grounded.

The two switch terminals may be connected to the control means through a common-mode noise rejecting reactor.

The control means may include control semiconductor devices disposed on a printed-circuit board which may be covered by shield means covering the control semiconductor devices.

DESCRIPTION OF EMBODIMENT

Figure 1:
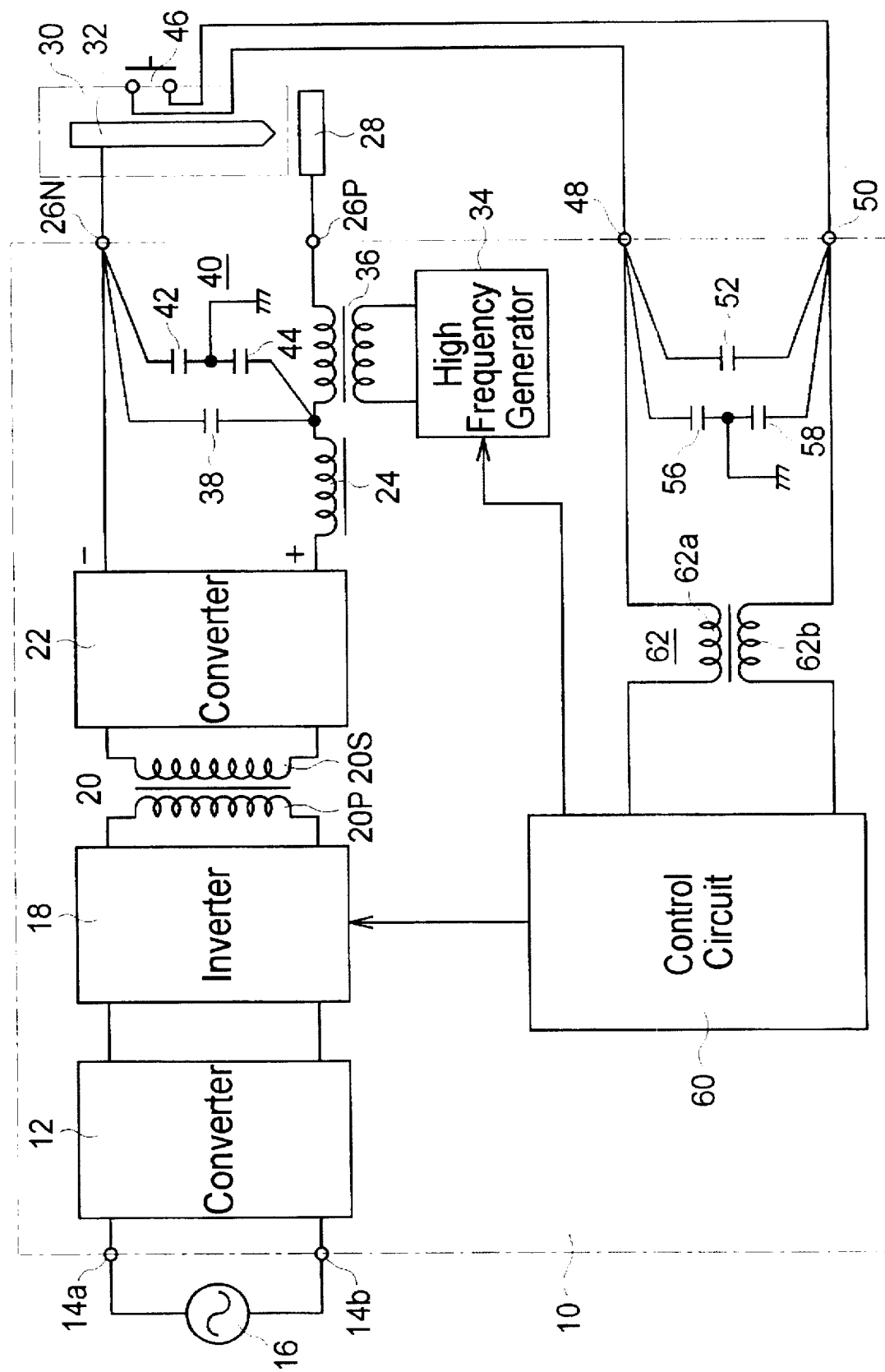
FIG. 1 is an electrical circuit diagram of a power supply apparatus according to an embodiment of the present invention.
Figure 2:
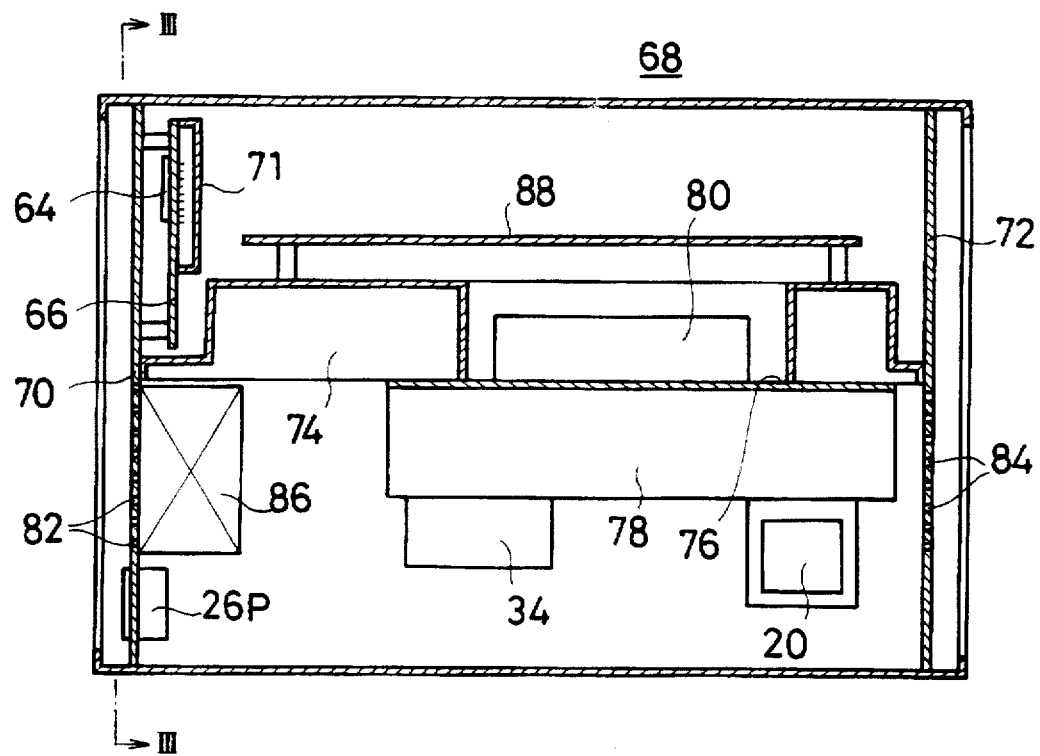
FIG. 2 is a cross-sectional view of the power supply apparatus of which the electrical circuit diagram is shown in FIG. 1.
Figure 3:
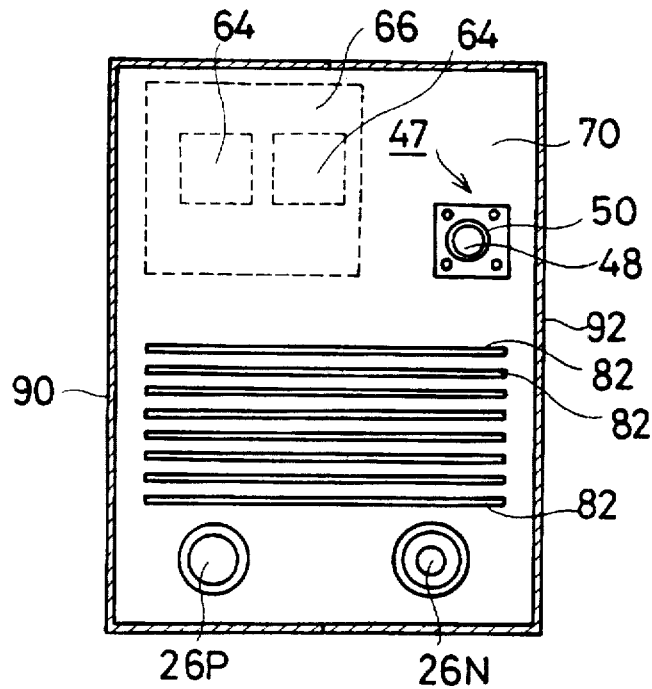
FIG. 3 is a cross-sectional view along a line III—III in FIG. 2.

A power supply apparatus 10 according to an embodiment of the present invention is housed in a casing 68 formed by front and rear panels 70 and 72 and side panels 90 and 92 (FIGS. 2 and 3). The power supply apparatus 10 includes a converter 12. An AC voltage is applied from an AC voltage supply 16 to the converter 12 via voltage supply terminals 14a and 14b. The converter 12 includes a rectifier and a smoothing capacitor, for converting the AC voltage into a DC voltage.

The DC voltage from the converter 12 is applied to an inverter 18 which includes a plurality of semiconductor switching devices, e.g. IGBT's (insulated-gate bipolar transistors) or power FET's. The inverter 18 converts the DC voltage into a high-frequency voltage.

The high-frequency voltage from the inverter 18 is applied across a primary winding 20P of an isolation voltage-transformer 20, and a voltage-transformed high-frequency voltage is induced in a secondary winding 20S of the isolation transformer 20.

The voltage-transformed high-frequency voltage induced in the secondary winding 20S is applied to another converter 22. The converter 22, like the converter 12, includes a rectifier and a smoothing capacitor, for converting the high-frequency voltage into a DC voltage. Because of the use of the isolation transformer 20, the inverter 18 and the converter 22 are isolated from each other. A positive-side output-voltage terminal of the converter 22 is connected through a smoothing reactor 24 to an output terminal 26P. A negative-side output-voltage terminal of the converter 22 is connected to an output terminal 26N.

The output terminal 26P is connected to a workpiece 28 to be processed, and the output terminal 26N is connected to a torch electrode 32 of a torch 32 of arc-utilizing equipment.

The power supply apparatus 10 includes a high-frequency voltage generator circuit 34. The circuit 34 includes a coupling coil 36. The coupling coil 36 is connected between the smoothing reactor 24 and the output terminal 26P. A bypass capacitor 38 is connected between the output terminal 26N and the junction between the coupling coil 36 and the reactor 24. Accordingly, when the high-frequency voltage generator circuit 34 is operated to generate a high-frequency voltage for producing a pilot arc between the torch electrode 32 and the workpiece 28, current from the high-voltage generator circuit 34 flows through the output terminal 26P, the workpiece 28, the torch electrode 32, the output terminal 26N and the bypass capacitor 38 back to the high-voltage generator circuit 34, and does not flow into the converter 22.

The bypass capacitor 38 is connected directly, i.e. without using connecting lines, between the junction between the coupling coil 36 and the smoothing reactor 24 and the output terminal 26N, which prevents radiation of high-frequency noise which could otherwise be radiated from such connecting lines.

A circuit 40 including two serially connected capacitors 42 and 44 having the same capacitance is connected in parallel with the bypass capacitor 38. The junction between the capacitors 42 and 44 is grounded. The series circuit of the capacitors 42 and 44, too, is connected directly, i.e. without using connecting lines, between the output terminal 26N and the junction between the coupling coil 36 and the smoothing reactor 24. Accordingly, there is substantially no radiation of high-frequency noise which could otherwise be radiated from such connecting lines. Accordingly, if high-frequency noise attributable to arc occurring between the torch electrode 32 and the workpiece 28 is transmitted to a line interconnecting the torch electrode 32 and the output terminal 26N and to a line interconnecting the workpiece 28 and the output terminal 26P, such noise will be released into the ground through the capacitors 42 and 44 and cancelled.

The torch 30 includes a switch 46 which is used to give a command to turn on the high-frequency generator circuit 34. The switch 46 is connected to two switch terminals 48 and 50 in a switch connector 47 (FIG. 3) of the apparatus 10 by connecting lines. A bypass capacitor 52 is connected directly, i.e. without using connecting lines, between the two switch terminals 48 and 50. Any noise attributable to arcing between the torch electrode 32 and the workpiece 28 and induced in a transmission line connected to the switch 46 returns to the switch 46 through the bypass capacitor 52. Further, because of no lines being used to connect the bypass capacitor 52 between the switch terminals 48 and 50, substantially no noise, which could otherwise be radiated from such lines, is radiated.

A circuit 54 including two capacitors 56 and 58 of the same capacitance is connected in parallel with the bypass capacitor 52, with the junction between the capacitors 56 and 58 grounded. The circuit 54 is connected directly, i.e. with using no connecting lines, between the switch terminals 48 and 50. Thus, if high-frequency noise is transmitted through the two lines which interconnect the switch 46 to the switch terminals 48 and 50, it flows into ground through the capacitors 56 and 58 and does not flow into a control circuit 60 which is described below.

The control circuit 60 is connected to the switch terminals 48 and 50 through a common-mode noise rejecting reactor 62. The common-mode noise rejecting reactor 62 includes two windings 62a and 62b. The winding 62a connects the switch terminal 48 to the control circuit 60, and the winding 62b connects the switch terminal 50 to the control circuit 60. With this arrangement, if high-frequency noise which has not been removed by the capacitors 56 and 58 is directed through the windings 62a and 62b toward the control circuit 60, it is subjected to the common-mode rejection provided by the windings 62a and 62b and, therefore, is cancelled.

The control circuit 60 controls the operations of the inverter 18 and the high-frequency voltage generator circuit 34, and includes a plurality of semiconductor devices 64 (FIGS. 2 and 3), such as a CPU and a PLD. The semiconductor devices 64 are disposed on a printed-circuit board 66 as shown in FIG. 2. The semiconductor devices 64 are mounted on the printed-circuit board 66 in such a manner that pins of the semiconductor devices 64 extend through the printed circuit board 66 in the direction opposite to the front panel 70 of the casing 68.

The printed-circuit board 66 is located inward of the front panel 70 and is mounted on the upper portion of the panel 70. As shown in FIG. 3, the connector 47 including the switch terminals 48 and 50 is also mounted on a different location of the upper portion of the front panel 70. The output terminals 26P and 26N are mounted, being spaced from each other, on the front panel 70 in its lower portion.

The printed-circuit board 66 is mounted in the proximity of the front panel 70 in order to reduce the length of lines connecting various switches and knobs (not shown) mounted on the front panel 70 to the control circuit 60. These switches and knobs are used to set the operating condition of the inverter 18.

A shield case 71 to enclose all of the pins of the semiconductor devices 64 is mounted on the surface of the front panel 70 opposite to the surface on which the printed-circuit board 66 is mounted. The shield case 71 is formed of a sheet of electrically conductive material, for example, aluminum or copper. The opposing surfaces of the conductive sheet may be coated with a water-resistant, heat-resistant, electrically insulating material, for example, synthetic resin. The electrically conductive sheet is connected to a point of ground potential on the printed-circuit board 66. The insulating material over the electrically conductive sheet prevents the sheet from contacting the printed-circuit board 66, which otherwise would interfere with the operation of the circuits on the printed-circuit board 66. The coating with the insulating material is particularly advantageous when the electrically conductive sheet is pliable.

That one of the semiconductor devices 64 which is closest to the switch terminals 48 and 50 is spaced by about 20 mm from the terminals 48 and 50. Accordingly, the respective semiconductor devices 64 are spaced by about 20 mm or more from the output terminals 26P and 26N.

Because, in addition to the fact that the control semiconductor devices 64 are spaced from the switch terminals 48, 50 and also from the output terminals 26P and 26N, they are also shielded by the shield case 71, the semiconductor devices 64 are protected from high-frequency noise which may override the above-described various measures against such high-frequency noise and reach the devices 64. The semiconductor devices 64 are protected also from water by the shield case 71 coated with the water-resistant insulating material.

The rear panel 72 is spaced from the front panel 70. Opposing edges of an intermediate partition wall 74 are connected to the front and rear panels 70 and 72 at locations intermediate between the upper and lower edges of the front and rear panels 70 and 72. The partition wall 74 divides the space defined by the front and rear panels 70 and 72 and the side panels 90 and 92 into upper and lower regions. A window 76 is formed in the partition wall 74 to make the upper and lower regions communicate with each other through the window 76. Heat dissipating means, e.g. a heat sink 78, is disposed in the lower region in such a manner as to close the window 76. The heat sink 78 is mounted on the partition wall 74. A semiconductor module 80 including the semiconductor switching devices of the inverter 18 and the rectifiers of the converters 12 and 22 is mounted on the upper surface of the heat sink 78. Accordingly, heat generated by the semiconductor module 80 is dissipated into the lower region through the heat sink 78.

In the lower region, the high-frequency voltage generator circuit 34, the isolation transformer 20, and the coupling coil 36 (not shown in FIG. 2) are also disposed.

Air intake slots 82 are-formed in the front panel 70, and air outlet slots 84 are formed in the rear panel 72. A fan 86 is mounted on the front panel 70. Air is taken through the air intake slots 82 and discharged through the air outlet slots 84 by the fan 86, so that the heat sink 78, the high-frequency generator circuit 34, and the isolation transformer 20 are cooled.

In the upper region, another printed-circuit board 88 is disposed above the partition wall 74. Components including the smoothing capacitors of the converters 12 and 22 are disposed on the printed-circuit board 88.

Various modifications to the above-described embodiment may be possible. For example, the shield case 71 need not be mounted on the printed-circuit board 66, but it may be attached to the side panel 90 in such a manner as to extend over the pins of the semiconductor devices. Further, another metal sheet may be disposed over the surface of the printed-circuit board 66 facing the front panel 70 to cover the semiconductor devices 64.

What is claimed is:

1. A power supply apparatus for arc-utilizing equipment, comprising:

first converter means for receiving and converting an AC voltage to a DC voltage;

inverter means for converting said DC voltage from said first converter means to a high-frequency voltage;

a voltage-transformer having primary and secondary windings, said transformer receiving said high frequency voltage from said inverter means and inducing a voltage-transformed high-frequency voltage in said secondary winding;

second converter means for converting said voltage-transformed high-frequency voltage from said voltage-transformer to a DC voltage;

two output terminals between which an output voltage of said second converter means is developed, said two output terminals being adapted for connection to a torch electrode of a torch of said arc-utilizing equipment and a workpiece to be processed by said equipment, respectively;

high-frequency voltage generating means including a coupling coil having its one end connected to one of said two output terminals;

a bypass capacitor connected between the other end of said coupling coil and the other one of said two output terminals; and control means for controlling said high-frequency voltage generating means and said inverter means;

said bypass capacitor being connected directly between said other output terminal and said other end of said coupling coil.

2. A power supply apparatus for arc-utilizing equipment, comprising:

first converter means for receiving and converting an AC voltage to a DC voltage;

inverter means for converting said DC voltage from said first converter means to a high-frequency voltage;

a voltage-transformer having primary and secondary windings, said transformer receiving said high-frequency voltage from said inverter means and inducing a voltage-transformed high-frequency voltage in said secondary winding;

second converter means for converting said voltage-transformed high-frequency voltage from said voltage-transformer to a DC voltage;

two output terminals between which an output voltage of said second converter means is developed, said two output terminals being adapted for connection to a torch electrode of a torch of said arc-utilizing equipment and a workpiece to be processed by said equipment, respectively;

high-frequency voltage generating means having its one end connected to one of said two output terminals;

a first bypass capacitor directly connected between the other end of said high-frequency voltage generating means and the other one of said two output terminals;

control means for controlling said high-frequency voltage generating means and said inverter means; and a circuit including two serially connected capacitors, said circuit being connected in parallel with said first bypass capacitor, between said other end of said high-frequency voltage generating means and said other output terminal, the junction between said two serially connected capacitors being grounded.

3. The power supply apparatus for arc-utilizing equipment according to claim 2 wherein said control means has a control semiconductor device disposed on a printed circuit board, and shield means is disposed to cover said control semiconductor device.

4. A power supply apparatus for arc-utilizing equipment, comprising:

first converter means for receiving and converting an AC voltage to a DC voltage;

inverter means for converting said DC voltage from said first converter means to a high-frequency voltage;

a voltage-transformer having primary and secondary windings, said transformer receiving said high-frequency voltage from said inverter means and inducing a voltage-transformed high-frequency voltage in said secondary winding;

second converter means for converting said voltage-transformed high-frequency voltage from said secondary winding of said voltage-transformer to a DC voltage;

two output terminals between which an output voltage of said second converter means is developed, said two output terminals being adapted for connection to a torch electrode of a torch of said arc-utilizing equipment and a workpiece to be processed by said equipment, respectively;

high-frequency voltage generating means having its one end connected to one of said two output terminals;

a first bypass capacitor directly connected between the other end of said high-frequency voltage generating means and the other one of said two output terminals;

control means for controlling said high-frequency voltage generating means and said inverter means;

two switching terminals connected to said control means and adapted to receive a turn-on command signal from a switch associated with said torch for turning on said high-frequency voltage generating means; and a second bypass capacitor connected directly between said two switching terminals.

5. The power supply apparatus for arc-utilizing equipment according to claim 4, further comprising a circuit including two serially connected capacitors, said circuit being connected in parallel with said second bypass capacitor, directly between said two switching terminals, the junction between said two serially connected capacitors being grounded.

6. The power supply apparatus for arc-utilizing equipment according to claim 5 wherein said control means and said two switching terminals are interconnected through a common-mode noise rejecting reactor.

7. The power supply apparatus for arc-utilizing equipment according to claim 4 wherein said control means has a control semiconductor device disposed on a printed circuit board, and shield means is disposed to cover said control semiconductor device.

* * * * *